(No Model.)
M. W. ARMSTRONG.
BICYCLE CANOPY.
No. 531,990. Patented Jan. 1, 1895.
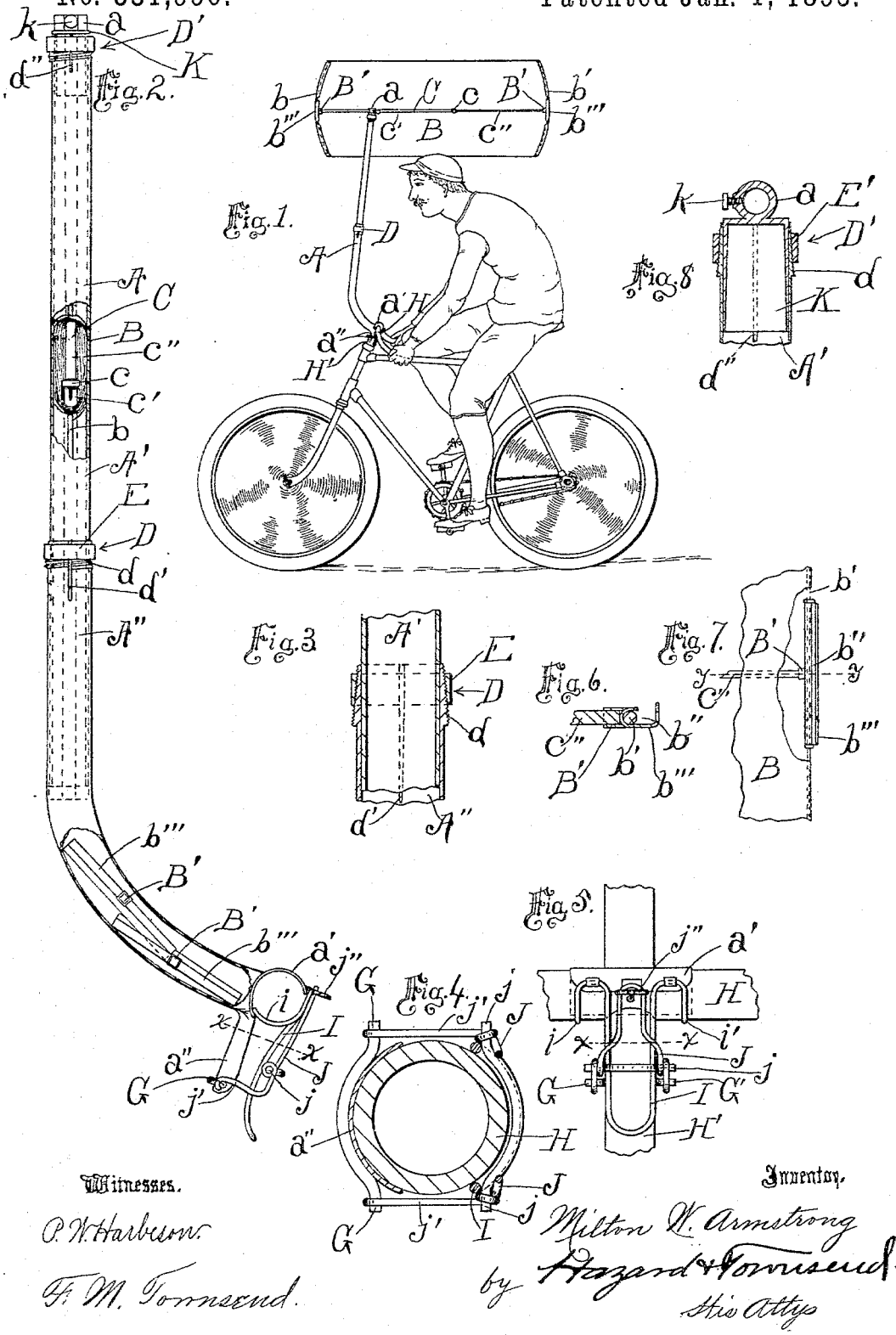
Witnesses.
O. W. Harbeson.
F. M. Townsend.
Inventor.
Milton W. Armstrong
by Hazard & Townsend
his Attys

UNITED STATES PATENT OFFICE.

MILTON W. ARMSTRONG, OF NEAR LOS ANGELES, CALIFORNIA, ASSIGNOR OF ONE-HALF TO GADI S. GIBSON, OF SAME PLACE.

BICYCLE-CANOPY.

SPECIFICATION forming part of Letters Patent No. 531,990, dated January 1, 1895.

Application filed April 29, 1893. Serial No. 472,385. (No model.)

*To all whom it may concern:*

Be it known that I, MILTON W. ARMSTRONG, a citizen of the United States, residing near Los Angeles, in the county of Los Angeles and State of California, have invented new and useful Improvements in Canopies for Bicycles, of which the following is a specification.

One object of my invention is to provide a neat, strong, artistic canopy for bicycles or other vehicles, which will shade a maximum area with a minimum weight of material.

A further object of my invention is to produce a canopy provided with superior means of adjustment whereby the canopy can be quickly adjusted to suit the user.

A further object of my invention is to provide a strong, simple, and efficient clamp for clamping the canopy support to the bicycle.

My invention comprises various features of construction and combinations of parts hereinafter fully set forth.

The accompanying drawings illustrate my invention.

Figure 1 is a side elevation of a bicycle provided with my improved canopy, and with a rider in position on the bicycle. Fig. 2 is a side elevation of my improved canopy and support, the canopy being rolled up and inserted in the tubular support which forms the case for the canopy. A portion of the case and the canopy is broken away to show the position of the various parts, and the lower portion of the case is broken away to show the rib socket members in place in the bottom of the case. Fig. 3 is a fragmental longitudinal mid-sectional view of one of the telescoping joints. Fig. 4 is a transverse section on line $x$—$x$, Fig. 5, looking down, illustrating my improved means for clamping the support to the standard of the bicycle. Fig. 5 is a front view of a fragment of a handle bar and the standard of a bicycle with the lower part of a canopy support clamped thereupon by my improved clamp. Fig. 6 is a sectional view on line $y$—$y$, Fig. 7, illustrating the construction of the rib socket members. Fig. 7 is a fragmental plan view illustrating the same. Fig. 8 is a fragmental sectional detail of the top of the support, showing the cap in place therein and the socket for the canopy stretching beam.

In equipments for bicycle riders, the great desideratum is to attain the object sought for with the smallest practicable weight of material, so that the rider will not be unduly encumbered. A canopy to shield the rider from the rays of the sun during certain portions of the day is very desirable, but at other times it is unnecessary and inconvenient if kept extended. Bicycle canopies have heretofore been provided which may be folded and inserted into a case, and I do not claim such construction broadly.

In my improved device I form the support for the canopy out of a tube A which has its body arranged and adapted to form a case to contain the canopy cover B and the frame of the canopy, when the canopy cover and frame are folded, and provide such case or support at its lower end with a suitable clamp adapted to clamp upon a bicycle, and provide it at its other end with suitable means for holding a canopy frame, and I provide a canopy frame adapted to be engaged by the canopy holding means upon the support, and a suitable canopy cover attached to said frame; the frame and the cover having their various parts arranged to be extended to form a canopy, and to be folded into suitable shape to adapt it to be inserted into the tubular support when not in use.

To provide for the vertical adjustment of the canopy, I form the support A in two parts A' and A'' which are adapted and arranged to telescope together, and I provide the outer member A'' of the support with a conical screw threaded boss $d$ and with a longitudinal slot $d'$ to allow the outer member A'' to be compressed upon the inner member A'. A screw threaded compression ring E is screwed upon the conical boss and compresses the member A'' upon the member A' to hold them in rigid connection with each other.

The lower end of the case or support A is curved toward the rear and is provided at its bottom with a thin saddle plate $a'$ which is curved in cross-section and fixed to the support and is adapted and arranged to fit upon the handle bar H of the bicycle. A thin standard engaging brace $a''$ curved in cross-section is fixed to the front of the saddle plate $a'$ (or to the support A') and extends downward and is arranged to fit upon the standard H' of the bicycle to form a rigid brace for the support A. Any suitable clamp may be arranged to respectively clamp the saddle plate and the standard brace upon the handle bar and the standard to secure the support to the bicycle.

I provide improved means for quickly and rigidly clamping the saddle plate and the standard brace to the bicycle, which means consists of the handle bar clamping lever I, which is pivoted to the rear of the saddle plate $a'$, and is provided with downwardly and forwardly curved clamping arms $i\ i'$ which are arranged and adapted to engage with the handle bar of the bicycle, to clamp such handle bar between such clamping arms and the saddle plate when the handle bar clamping lever I is forced downward against the standard H'. In order to hold the handle bar clamping lever I against the standard and to clamp the standard brace $a''$ against the standard, I provide a standard clamping lever J which is pivoted to the handle bar clamping lever by a pivot $j$, and has one end provided with rearwardly projecting arms $j'$ adapted to engage with suitable lugs G G' provided upon the standard brace $a''$ when the handle bar clamping lever is in position against the standard, and having its other end arranged to act as a lever to draw the standard brace $a''$ and the handle bar clamping lever I firmly against the standard when such other end of the lever is forced toward the handle bar. A suitable catch $j''$ is arranged upon the saddle plate $a'$ to engage the standard clamping lever J to retain it in its clamping position. The other or upper end of the standard A is provided with a cap K which is adapted to close such upper end of the standard and is provided with a suitable transverse socket $a$ which is adapted to receive the canopy stretching beam therein and to allow such beam to slide longitudinally in such socket. A set screw $k'$ is provided to clamp the canopy stretching beam in the socket to secure it against longitudinal movement. The cap K is secured in the upper end of the case A by a telescoping joint D' which is similar in construction to that shown in Fig. 3 and consists of the outer member A' provided with the longitudinal slot $d''$, and the compression ring E' screwed upon the conical screw boss $d$. This construction admits of the cap K being removed from the upper end of the case to allow the folded canopy and the frame to be inserted into the case and also admits of the adjustment of the canopy relative to the bicycle. By unscrewing the compression ring E' to loosen the outer member A' the cap may be rotated in the member A' to adjust the canopy relative to the bicycle.

It is highly desirable that a bicycle canopy be flat and horizontally arranged in order to avoid as far as possible the resistance of the atmosphere upon the canopy while the rider is in motion.

My improved canopy whereby I secure the greatest area of shade with the smallest possible weight of material and resistance to the atmosphere, consists of the rectangular canopy cover B which is provided upon two of its opposite sides with canopy stretching ribs $b\ b'$ which extend across the full width of the canopy cover and are attached to such cover. These ribs are formed of spring steel wire or any other strong, light material, and are each arranged at their mid length to be inserted into suitable rib socket members $b'''$ which rib socket members are respectively provided upon the opposite ends of the canopy stretching beam C. The ribs $b\ b'$ are of suitable length to be inserted into the tubular support A.

The means for stretching the canopy consists of the canopy stretching beam C which is formed of two members $c'$ and $c''$ which are adapted and arranged to telescope together, and are provided with the telescoping joint $c$ which is similar in construction to that shown in Fig. 3 and therefore is not illustrated in detail herein. This canopy stretching beam C is provided upon each end with a rib socket member $b'''$ which members are respectively provided with sockets $b''$ adapted to engage the ribs $b\ b'$ near their mid length to force such ribs apart to thereby stretch the canopy cover, and are also provided with sockets B' adapted to receive the ends of the stretching beam C. The stretching beam sockets B' are rectangular in cross section and the ends of the beam C are also rectangular in cross section to prevent the socket members from turning upon the beam when in place thereupon.

When it is desired to incase the canopy cover and the canopy frame in the tubular support or case A, the joint $c$ is loosened and the members $c'$ and $c''$ are telescoped together to loosen the canopy cover B to allow the ribs $b\ b'$ to be removed from the rib sockets $b''$. The ribs are then removed from the rib sockets, the socket members $b'''$ are removed from the ends of the stretching beam C, the set screw $k'$ is loosened and the stretching beam is slipped longitudinally out of the socket $a$. The stretching beam C is then telescoped until it is of equal length with the ribs $b\ b'$ and the canopy cover B is then rolled upon the ribs and the stretching beam. The cap K is then removed from the member A' by loosening the ring E' and the rib socket members $b'''$ are inserted in the case or support A at the top thereof which is open when the cap K is removed therefrom and slide down to the bottom of the case and assume the position shown in Fig. 2. Then the canopy cover and the frame consisting of the ribs $b\ b'$ and the stretching beam C are inserted in the case as indicated in Fig. 2, the cap K is replaced, and the ring E' is screwed down to clamp the cap firmly in the end of the case.

If it is desired to remove the support from the bicycle, the standard clamping lever J is released by releasing the catch $j''$, the lug engaging arms are released from the lugs G G', the handle bar clamping lever I is swung upward on its pivot to release the handle bar clamping members $i\ i'$ from the handle bar and the support may then be removed from the bicycle.

To place the canopy in position upon the bicycle, the operation just described is reversed. If desired, the support may be released from the bicycle before removing the canopy from the support.

By reason of the longitudinal movement of the stretching beam C in the socket $a$, the canopy may be shifted backward or forward to bring the shade into the desired locality with relation to the wheel, and the canopy may also be turned at an angle with the support A by partially rotating the stretching beam C in the socket $a$. By loosening the ring E' the canopy may also be adjusted sidewise by partially rotating the beam C and the cap K upon the axis of the support, and it may then be secured in the desired position by tightening the ring E' upon the member A' to clamp the cap K.

While my improved canopy is especially adapted for use upon bicycles, it is also adapted for use upon baby carriages and other vehicles, and the clamp may be arranged to clamp upon any suitable portion of the vehicle.

Now, having described my invention, what I claim as new, and desire to secure by Letters Patent, is—

1. The canopy set forth comprising a support curved toward the rear at its lower end and provided at said end with a thin saddle plate curved in cross-section fixed to the support and adapted to fit upon the handle bar of a bicycle; a thin standard-engaging brace curved in cross-section fixed to such saddle plate and arranged to extend downward, along, and to fit upon the standard of the bicycle; and a clamp arranged to clamp the saddle plate and the brace upon the handle bar and the standard.

2. In a bicycle canopy the combination of the support having at its upper end a transverse socket, a canopy stretching beam, arranged and sliding in said socket, said beam provided at each end with a rib socket, and a rectangular cover having upon its opposite edges stretching ribs, such ribs being arranged one in each of the rib sockets, and suitable means for clamping the stretching beam in the transverse socket, substantially as set forth.

3. The combination set forth of the support; the saddle plate fixed to such support and adapted to fit upon the handle bar; the standard engaging brace fixed to the front of such saddle plate and arranged to fit upon the standard; the handle bar clamping lever pivoted to the front of the saddle plate and provided with a downwardly and forwardly curved clamping arm adapted to clamp the handle bar between such clamping arm and the saddle plate when the handle bar clamping lever is forced against the standard; the standard brace clamping lever pivoted to a clamping lever and provided with two rearwardly projecting lug engaging arms arranged respectively to engage with suitable lugs provided upon the standard engaging brace when the handle bar clamping lever is thrown against the standard, and adapted to clamp the standard between the standard engaging brace and the handle bar clamping lever when the standard clamping lever is forced toward the handle bar; such lugs arranged on the standard engaging brace, and a suitable catch arranged to engage such standard clamping lever to retain it in its clamping position.

MILTON W. ARMSTRONG.

Witnesses:
ALFRED I. TOWNSEND,
F. M. TOWNSEND.